(12) United States Patent
Myers

(10) Patent No.: US 9,814,225 B2
(45) Date of Patent: Nov. 14, 2017

(54) MINNOW CONTAINER

(71) Applicant: Bradley Walter Myers, East Earl, PA (US)

(72) Inventor: Bradley Walter Myers, East Earl, PA (US)

( * ) Notice: Subject to any disclaimer, the term of this patent is extended or adjusted under 35 U.S.C. 154(b) by 189 days.

(21) Appl. No.: 14/683,404

(22) Filed: Apr. 10, 2015

(65) Prior Publication Data
US 2016/0081319 A1 Mar. 24, 2016

Related U.S. Application Data

(60) Provisional application No. 62/071,373, filed on Sep. 23, 2014.

(51) Int. Cl.
*A01K 97/05* (2006.01)
*A01K 97/04* (2006.01)

(52) U.S. Cl.
CPC .............. *A01K 97/05* (2013.01); *A01K 97/04* (2013.01)

(58) Field of Classification Search
CPC .................................. A01K 97/05; A01K 97/04
USPC ............... 43/56, 57, 55; 222/189.06, 189.07, 222/189.09; 210/295, 296, 299
See application file for complete search history.

(56) References Cited

U.S. PATENT DOCUMENTS

| | | | | |
|---|---|---|---|---|
| 299,690 A * | 6/1884 | Sherwood | ............. | A01K 97/05 43/56 |
| 302,086 A * | 7/1884 | Barton | .................. | A01K 97/05 43/56 |
| 321,606 A * | 7/1885 | Hough | .................. | A01K 97/05 43/56 |
| 372,233 A * | 10/1887 | Northrop | .............. | A01K 97/05 43/56 |
| 458,529 A * | 8/1891 | Williams | .............. | A01K 97/05 43/56 |
| 504,526 A * | 9/1893 | Hemp | .................... | A01K 97/05 43/56 |
| 647,257 A * | 4/1900 | Gray | ...................... | A01K 97/05 43/57 |
| 661,093 A * | 11/1900 | Warren | ................. | A01K 97/05 43/56 |
| 713,890 A * | 11/1902 | Koch | .................... | A01K 97/05 43/56 |
| 769,874 A * | 9/1904 | Paar | ...................... | A01K 97/05 43/56 |

(Continued)

FOREIGN PATENT DOCUMENTS

| | | | | |
|---|---|---|---|---|
| CA | 2873480 C | * | 9/2016 | ............ A01K 97/05 |
| GB | 2495946 A | * | 5/2013 | ............ A01K 97/04 |

(Continued)

*Primary Examiner* — Darren W Ark
(74) *Attorney, Agent, or Firm* — John D. Gugliotta

(57) ABSTRACT

A container for animals or objects in a liquid is disclosed. The container comprises a cylinder capped by two removable lids and a floating basket. When one of the lids is removed, the liquid may be drained and refreshed without either the basket or the contained animals or objects falling out. When the other lid is removed, the basket floats above the liquid and carries the animals or objects out of the liquid where they can be easily removed by a user. The container is useful to anglers who use live minnows as bait, but may be useful in several other applications.

11 Claims, 4 Drawing Sheets

(56) References Cited

U.S. PATENT DOCUMENTS

| | | | | |
|---|---|---|---|---|
| 1,110,892 A * | 9/1914 | Cather | A01K 97/05 | 43/56 |
| 1,436,835 A * | 11/1922 | Van Pelt | A01K 97/05 | 43/56 |
| 1,508,903 A * | 9/1924 | Strandt | B67C 3/04 | 137/432 |
| 1,528,465 A * | 3/1925 | Burbank | A01K 97/05 | 43/56 |
| 1,635,175 A * | 7/1927 | Corwin | F02M 1/00 | 137/398 |
| 1,897,571 A * | 2/1933 | Camporini | A01K 97/05 | 43/56 |
| 1,942,756 A * | 1/1934 | Howard | A01K 97/05 | 43/56 |
| 2,002,572 A * | 5/1935 | Forbes | A01K 97/05 | 43/56 |
| 2,020,536 A * | 11/1935 | Cox | A01K 97/05 | 43/56 |
| 2,093,132 A * | 9/1937 | Logan | A01K 97/05 | 43/56 |
| 2,181,612 A * | 11/1939 | Smith | A47J 43/27 | 222/189.06 |
| 2,216,202 A * | 10/1940 | Lake | A01K 97/05 | 43/56 |
| 2,244,457 A * | 6/1941 | Hartford | A01K 97/05 | 43/56 |
| 2,294,136 A * | 8/1942 | Smith | A01K 97/05 | 43/56 |
| 2,318,842 A * | 5/1943 | Eaton | B65D 83/005 | 43/56 |
| 2,341,246 A * | 2/1944 | Stowe | A01K 97/05 | 43/56 |
| 2,474,745 A * | 6/1949 | Lewis | A01K 97/05 | 43/56 |
| 2,489,710 A * | 11/1949 | Janisch | A01K 97/05 | 43/56 |
| 2,531,628 A * | 11/1950 | Janisch | A01K 97/05 | 43/56 |
| 2,540,758 A * | 2/1951 | Rinnman | F24F 3/1411 | 43/55 |
| 2,560,672 A * | 7/1951 | Volenec | A01K 97/05 | 43/57 |
| 2,564,598 A * | 8/1951 | Grimshaw | A01K 97/05 | 43/56 |
| 2,568,602 A * | 9/1951 | Anderson | A01K 97/04 | 43/55 |
| 2,573,352 A * | 10/1951 | Nicodemus | A01K 97/20 | 43/55 |
| 2,594,172 A * | 4/1952 | Huffman | A01K 97/05 | 43/56 |
| 2,595,726 A * | 5/1952 | Swanbeck | A01K 97/05 | 43/56 |
| 2,597,002 A * | 5/1952 | Johnson | A01K 97/05 | 43/56 |
| 2,600,826 A * | 6/1952 | Allen | A01K 97/05 | 43/56 |
| 2,613,843 A * | 10/1952 | Suda | A01K 97/05 | 43/56 |
| 2,630,651 A * | 3/1953 | McGee | A01K 97/04 | 43/55 |
| 2,656,640 A * | 10/1953 | Johnson | A01K 97/05 | 43/56 |
| 2,663,115 A * | 12/1953 | McKissack | A01K 97/05 | 43/56 |
| 2,664,854 A * | 1/1954 | Talbot | A01K 97/04 | 43/55 |
| 2,674,825 A * | 4/1954 | Rice | A01K 69/06 | 43/56 |
| 2,720,049 A * | 10/1955 | Basky | A01K 97/05 | 43/56 |
| 2,731,760 A * | 1/1956 | Ebert | A01K 97/05 | 43/57 |
| 2,734,305 A * | 2/1956 | Hannah | A01K 97/05 | 43/56 |
| 2,963,814 A * | 12/1960 | Zabrocki | A01K 97/05 | 43/56 |
| 3,000,132 A * | 9/1961 | Koistinen | A01K 97/05 | 43/56 |
| 3,002,312 A * | 10/1961 | Barker | A01K 97/05 | 43/56 |
| 3,212,210 A * | 10/1965 | Schmelzer, Jr. | A01K 97/05 | 43/57 |
| 3,248,016 A * | 4/1966 | Dahl | B65D 25/20 | 222/189.07 |
| 3,334,438 A * | 8/1967 | Fellers | A01K 97/05 | 43/56 |
| 3,423,869 A * | 1/1969 | Duerst | A01K 97/04 | 43/55 |
| 3,468,289 A * | 9/1969 | Broida | B65D 25/14 | 43/55 |
| 3,499,244 A * | 3/1970 | Malone | A01K 97/05 | 43/56 |
| 3,509,657 A * | 5/1970 | Bross, Jr. | A01K 97/05 | 43/57 |
| 3,510,978 A * | 5/1970 | Murdock | A01K 75/02 | 43/56 |
| 3,726,039 A * | 4/1973 | Borrelli | A01K 97/05 | 43/56 |
| 3,751,845 A * | 8/1973 | van Leeuwen | A01K 97/05 | 43/56 |
| 3,831,310 A * | 8/1974 | Frangullie | A01K 97/05 | 43/56 |
| 3,834,062 A * | 9/1974 | Nalepka | A01K 97/05 | 43/56 |
| 3,955,306 A * | 5/1976 | Handa | A01K 97/05 | 43/56 |
| 4,030,227 A * | 6/1977 | Oftedahl | A01K 97/05 | 43/56 |
| 4,158,267 A * | 6/1979 | Farnsworth | A01K 97/04 | 43/55 |
| 4,450,647 A * | 5/1984 | Schmidt | A01K 97/05 | 43/55 |
| 4,513,525 A * | 4/1985 | Ward | A01K 97/05 | 43/56 |
| 4,606,143 A * | 8/1986 | Murphy, Jr. | A01K 97/05 | 43/56 |
| 4,642,934 A * | 2/1987 | Carlson | A01K 97/20 | 43/56 |
| 4,686,788 A * | 8/1987 | Hartman | A01K 97/05 | 43/56 |
| 4,864,769 A * | 9/1989 | Sandahl | A01K 97/05 | 43/56 |
| 4,890,413 A * | 1/1990 | Nelson | A01K 97/20 | 43/56 |
| 5,109,625 A * | 5/1992 | Skrede | A01K 97/05 | 43/56 |
| 5,120,454 A * | 6/1992 | Wieties | B01D 29/03 | 222/189.06 |
| 5,123,198 A * | 6/1992 | Von Grossmann | A01K 97/05 | 43/56 |
| 5,138,975 A * | 8/1992 | Walsh | A01K 63/02 | 43/56 |
| 5,481,823 A * | 1/1996 | Hoover | A01K 97/04 | 43/55 |
| 5,507,113 A * | 4/1996 | Keller | A01K 97/05 | 43/55 |
| 5,586,406 A * | 12/1996 | Lin | A01K 97/04 | 43/56 |
| 5,661,924 A * | 9/1997 | Maxwell | A01K 97/05 | 43/56 |
| 6,354,246 B1 * | 3/2002 | Kamihata | A01K 63/02 | 119/496 |
| 6,421,951 B1 * | 7/2002 | Kuhl | A01K 97/05 | 43/56 |
| 6,442,887 B2 * | 9/2002 | Sanquist | A01K 97/05 | 43/56 |
| 6,857,222 B1 * | 2/2005 | King | A01K 97/05 | 43/56 |

(56) References Cited

U.S. PATENT DOCUMENTS

| | | | | |
|---|---|---|---|---|
| 6,886,291 | B1 * | 5/2005 | Jaggers | A01K 97/05 43/56 |
| 7,299,585 | B2 * | 11/2007 | Perttu | A01K 97/05 43/56 |
| 7,644,535 | B2 * | 1/2010 | Sloop | A01K 97/05 43/56 |
| 7,946,250 | B2 * | 5/2011 | Holms | A01K 63/006 119/245 |
| 8,695,536 | B2 * | 4/2014 | Hendey, III | A01K 97/20 119/247 |
| 8,845,895 | B1 * | 9/2014 | Ghiassi | C02F 1/002 222/189.06 |
| 2005/0086851 | A1 * | 4/2005 | Carden, Jr. | A01K 97/05 43/56 |
| 2008/0190011 | A1 * | 8/2008 | Neal | A01K 97/05 43/56 |
| 2012/0110890 | A1 * | 5/2012 | Garrett | A01K 97/20 43/55 |
| 2014/0345187 | A1 * | 11/2014 | Fontaine | A01K 97/04 43/55 |
| 2015/0107149 | A1 * | 4/2015 | Garrett | A01K 97/05 43/55 |
| 2015/0157002 | A1 * | 6/2015 | Paquette | A01K 97/05 43/56 |

FOREIGN PATENT DOCUMENTS

| | | | |
|---|---|---|---|
| JP | 08191645 A | * | 7/1996 |
| JP | 09037697 A | * | 2/1997 |
| JP | 10323151 A | * | 12/1998 |
| JP | 2002186393 A | * | 7/2002 |
| JP | 2005087081 A | * | 4/2005 |

* cited by examiner

MINNOW CONTAINER

FIELD OF THE INVENTION

The subject matter of this application pertains to devices for storing objects in liquid. More particularly, the subject matter of this application pertains to devices for storing objects in liquid which can be retrieved by a user without needing to reach into the liquid. Even more particularly, the subject matter of this application pertains to devices for storing bait fish such as minnows in water and allowing the user to remove one or more fish as needed without having to reach into the water and try to catch one. The device comprises a top lid, a bottom lid, and a water permeable floating basket. When the device is inverted and the bottom lid is removed, the basket carries the fish to the top of the device and largely out of the water allowing them to be easily grasped. When the top lid is removed, the water can be poured out and replaced while the bottom of the basket prevents the fish being escaping.

BACKGROUND

There are basically two types of bait an angler can use to catch fish: artificial lures and natural bait. Artificial lures have their fans and have certain advantages. For example, they can last indefinitely, be repeatedly used and even passed down to others, and can be painted bright, garish colors or have mirrored surfaces that stand out from their surroundings. Live bait, however, is still preferred by many anglers. Live bait will swim or struggle naturally when impaled on a hook, thereby attracting nearby fish. Live bait also has a certain smell that a plastic lure doesn't, which may be detected by the sought after fish. Live bait is also something a fish would ordinarily recognize as food, increasing the likelihood of a hit by a fish.

Live bait however, does have it's downsides. The number that a person can carry is finite, and although a minnow may live for a few casts, its attractiveness as a bait diminishes when it dies. If an angler runs out of live bait, or the bait dies before it can be used, the alternatives are to fall-back on an artificial lure or stop fishing; neither of which is a good option. As used herein, "minnow" should be understood to comprise all species of fish and other aquatic animals suitable as bait.

Most typically, anglers using live bait carry them in a minnow bucket, which, in its most basic form, is simply a pail. Often a sample of minnows are removed from the bucket to a smaller, more portable minnow jar. As used herein, "minnow container" or "container" is used to refer to either minnow buckets or pails. Over the last couple hundred years, other than changes in the materials used to construct them, little about minnow containers has changed. Although delving one's hand into water vessel to catch a minnow might sound like fun, it's not always easy to catch and pull one out without mangling it. At least, it's not easy until they die, which can easily happen if the level of dissolved oxygen in the water drops too low. Since minnow activity is related to the dissolved oxygen concentration, a careful angler will periodically assess minnow activity and attempt to change or aerate the water when activity slows. The oxygen level will more quickly drop with a high concentration of minnows, and a low concentration of minnows makes it more difficult to catch one in the bucket. Although perhaps not the biggest dilemma one might face, it remains a persistent one for anglers.

There have been patented minnow containers that have tried to mitigate this dilemma by either claiming to make the minnows easier to grab, such as U.S. Pat. Nos. 302,086 and 1,986,742; but most work in the minnow container art has been directed towards aerating the water such as U.S. Pat. Nos. 553,456, 2,706,870, and 2,998,671. The mentioned patents are not meant to be reflective of an exhaustive search, but are merely demonstrative of patents in this art. Certainly, other art exists.

SUMMARY

The subject matter of this application relates broadly to devices that house materials or creatures in liquid. More particularly, it pertains to devices that contain minnows or other live creatures in water (a "container" or "minnow container").

Although as any angler will agree, the worst day fishing is still better than the best day working, an improved minnow container would make fishing even more pleasant.

One objective of the subject matter of this application is to provide a minnow container that lifts minnows out of the water when desired so that the user may easily grab one. Another objective is to provide a minnow container that can be emptied and refilled with water without losing the minnows also in the bucket. A further objective of the subject matter of this application is to provide a minnow container that can easily be worn by a user. Yet another objective is to provide a minnow container which can house a larger concentration of minnows than other similarly sized minnow containers because the water can be easily and rapidly refreshed when minnow activity slows, indicating a lower dissolved oxygen concentration in the water.

In use, the disclosed minnow container comprises a floating basket, minnows, and water. The container is most preferably an annular cylinder comprising detachable lids on the top and the bottom of the cylinder such that the container is essentially water-tight when the lids are properly situated. The basket is water permeable. When one of the lids is removed, the basket floats towards the surface of the water and carries the minnows so that they are largely out of the water, but still surrounded by the side of the basket so they don't flop out of the bucket. The basket may be prevented from falling out of the cylinder by a blocking structure. When the other lid is removed, the bottom of the basket floats towards the top of the water and is held from moving past the surface of the cylinder so that the basket can be tilted to pour off deoxygenated water without losing the minnows and refilled with fresh oxygenated water.

The disclosed minnow container's cylinder is preferably substantially clear so the user can quickly assess the activity level of the minnow and refresh the water as needed. This along with the ease of which water can be replaced allows an angler to carry a higher density of minnows than would be practicable with other buckets that are either opaque or less easily refreshed.

BRIEF DESCRIPTION OF THE ILLUSTRATIONS

DETAILED DESCRIPTION OF THE ILLUSTRATION

Figure 1:
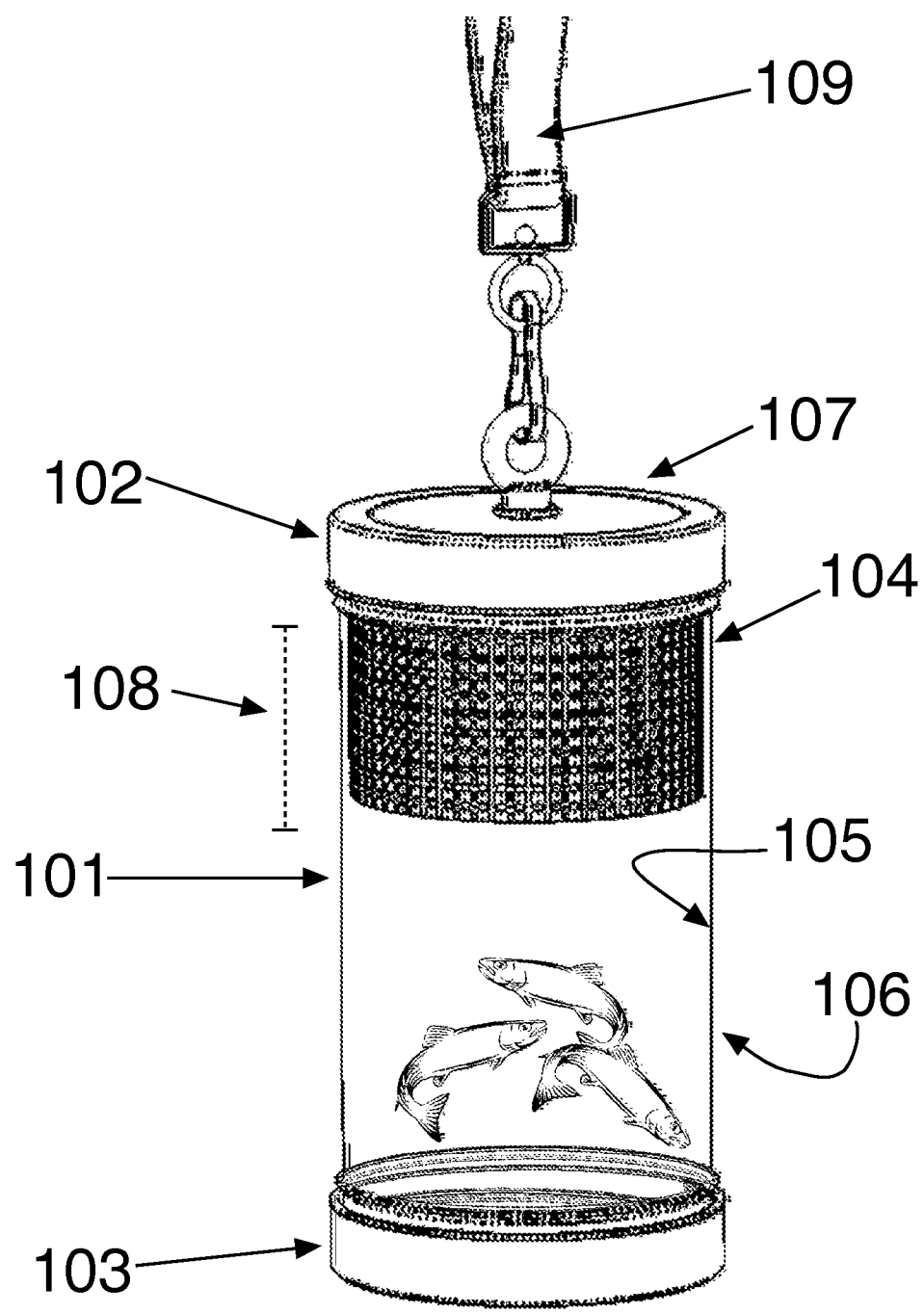
FIG. 1 shows a view of the disclosed minnow container.

The following description and drawings referenced therein illustrate embodiments of the application's subject matter. They are not intended to limit the scope. Those familiar with the art will recognize that other embodiments of the disclosed method and apparatus are possible. All such alternative embodiments should be considered within the scope of the application's disclosure.

Each reference number consists of three digits. The first digit corresponds to the figure number in which that reference number is first shown. Reference numbers are not necessarily discussed in the order of their appearance in the figures.

Although this application discusses the disclosed subject matter in the context of minnow containers, the subject matter of this application may have utility in other applications.

A minnow container comprises a cylinder (101), a first lid (102), a second lid (103), and a water-permeable basket (104).

The cylinder (101) is substantially annular and comprises an inner surface (105) having a diameter, an outer surface (106) having a diameter, an open first terminus (401), an open second terminus (402), a longitudinal axis (201), and a transverse axis (202). The cylinder further comprises a height measured along its longitudinal axis. The cylinder further comprises a blocking means located near, or at the level of the first terminus. In a most preferred embodiment this blocking means comprises a lip (403) formed along the inner surface of the cylinder within several millimeters of the cylinder's first terminus. This lip prevents the basket from falling out of the cylinder when the cylinder's first lid is removed. Other embodiments may utilize other blocking means to fulfill the same objective of keeping the floating basket from falling out of the cylinder when tilted to pour out water, and all should be considered to fall within the scope of the claims. One such alternative blocking means comprises one or more strips of material extending across the cylinder's open first terminus that prevent the basket from falling out of the cylinder when tilted. Another alternative blocking means comprises a net or similar piece of cloth stretched over the first open terminus. Yet another alternative blocking means may be integrated into the container's first lid. Such a lid may comprise a flip-top portion which, when opened, exposes a plurality of holes that allow water to flow out of the cylinder but retain the floating basket. Such shaker lids are known in the art and as often used with herb containers. The cylinder is at least partially transparent.

The first lid comprises an inner surface (203) and an outer surface (107) and is capable of reversibly attaching to the cylinder's first terminus (401) creating an essentially water-tight seal.

The second lid comprises an inner surface (404) and an outer surface (301) and is capable of reversibly attaching to the cylinder's second terminus (402) creating an essentially water-tight seal.

In a most preferred embodiment the mode of attachment for each of the cylinder's termini to its associated lid is a screw-type attachment whereby that portion of the outer surface of the cylinder within about a centimeter from the relevant terminus comprises male-type threads (407) that correspond to female threads (204) located on the inner surface of the relevant lid. Obviously, one or more lids could comprise male-type threads corresponding to female-type threads on the cylinder. Another favored embodiment eschews fully separable lids in favor of swing-top canister lids. The lids may further comprise gaskets increase the water-impermeability of the attachment.

The water-permeable basket comprises an inner surface (205) having a diameter, an outer surface (206) having a diameter, a longitudinal axis parallel to the cylinder's longitudinal axis when assembled, a transverse axis parallel to the cylinder's transverse axis when assembled, an open face (302), and a closed face (405). The basket is of sufficient buoyancy to float in water and support a plurality of minnows. In a preferred embodiment, the closed face comprises a buoyant member which accounts for the buoyancy of the basket. The diameter of the basket's outer surface is less than the cylinder's inner surface's diameter so that the basket fits within the cylinder. The water-permeable basket further comprises a height (108) measured along its longitudinal axis. The water-permeability of the basket is due to a plurality of holes in the closed face of the basket (406). Optimally, the basket also comprises holes along its side. All holes in the basket are sufficiently small to prevent minnows moving through them.

In use, the cylinder contains the basket which is oriented such that the basket's closed face is nearest the container's first lid and the basket's open face is nearest the container's second lid. Water and minnows are then added to the cylinder. Water may be added via the cylinder's open first terminus or the cylinder's open second terminus. Minnows, however, need to be added to the container through the cylinder's open second terminus so that the minnows may enter the basket though the basket's open face.

Once filled with water and minnows, and the lids in place, the container may be worn or connected to a structure through use of a lanyard (109) or other similar structure as shown in FIG. 1.

As worn or carried, the closed face of the basket floats near the top of the cylinder where it reaches the cylinder's said lip near the cylinder's first terminus and the container's first lid. The minnows swim beneath the basket's closed face where their activity level may be monitored by the angler.

Figure 3:
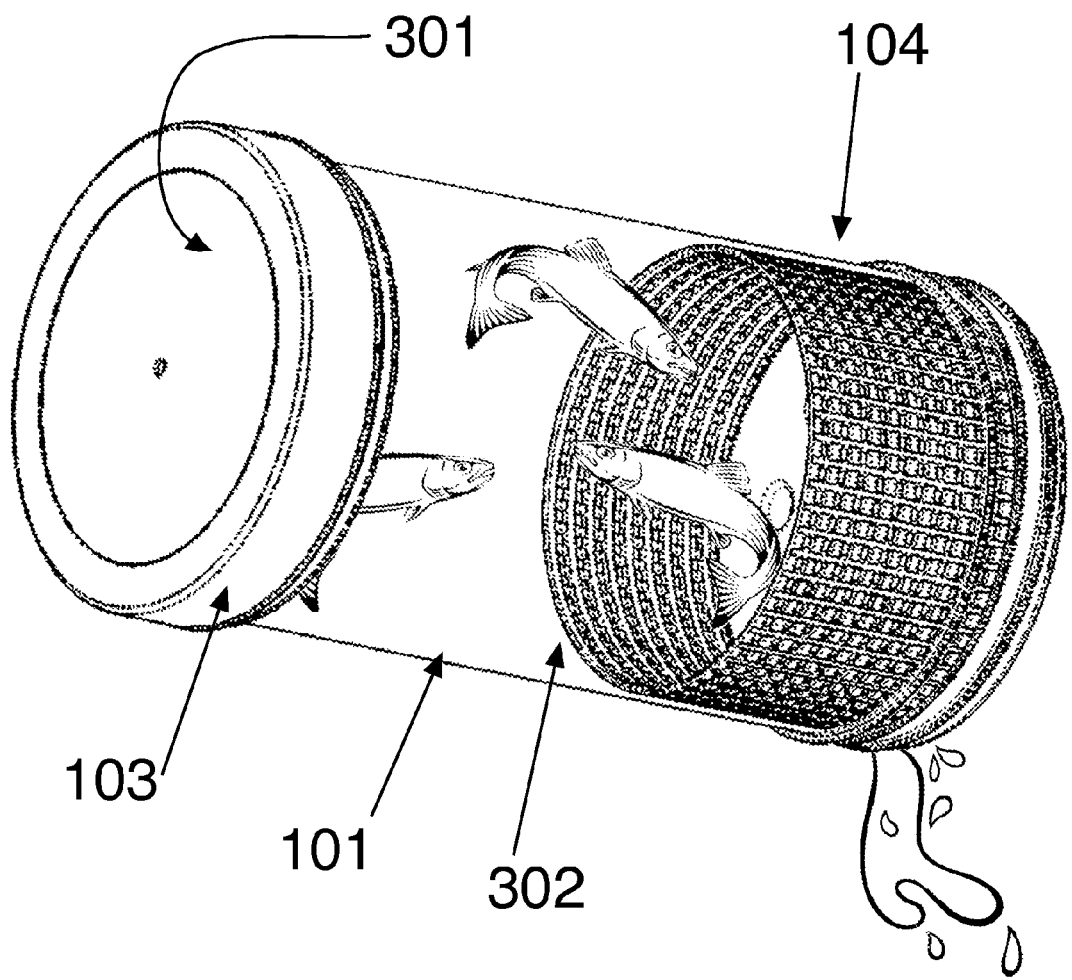
FIG. 3 is another view of the disclosed minnow container with the lid replaced from FIG. 2 and the other lid removed so that the container's water can be replaced.
Figure 4:
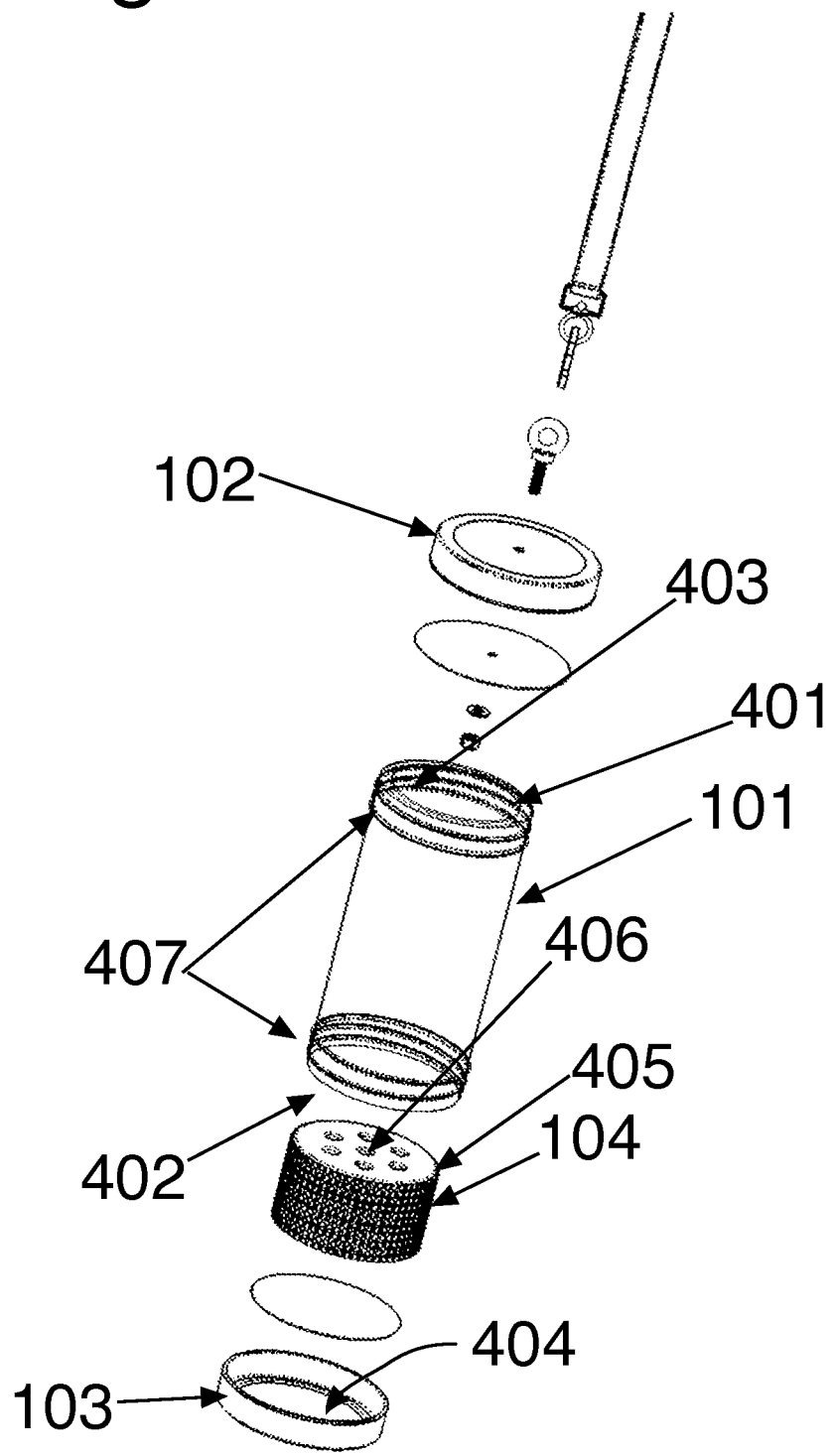
FIG. 4 is an exploded view illustration of the minnow container.

When the angler decides to refresh the water, often due to the minnow activity level dropping, the container's first lid is removed and the container tilted to pour out some or all of the water as shown in FIG. 3. The basket is kept within the cylinder by the cylinder's lip, and the fish as kept in the cylinder due to the holes in the basket's closed face being too small for them to move through. Fresh water can then be added to the cylinder and the first lid replaced. As discussed above, alternative embodiments that replace said lip with another structure having the same function may be used instead with such directions for use appropriately modified.

Figure 2:
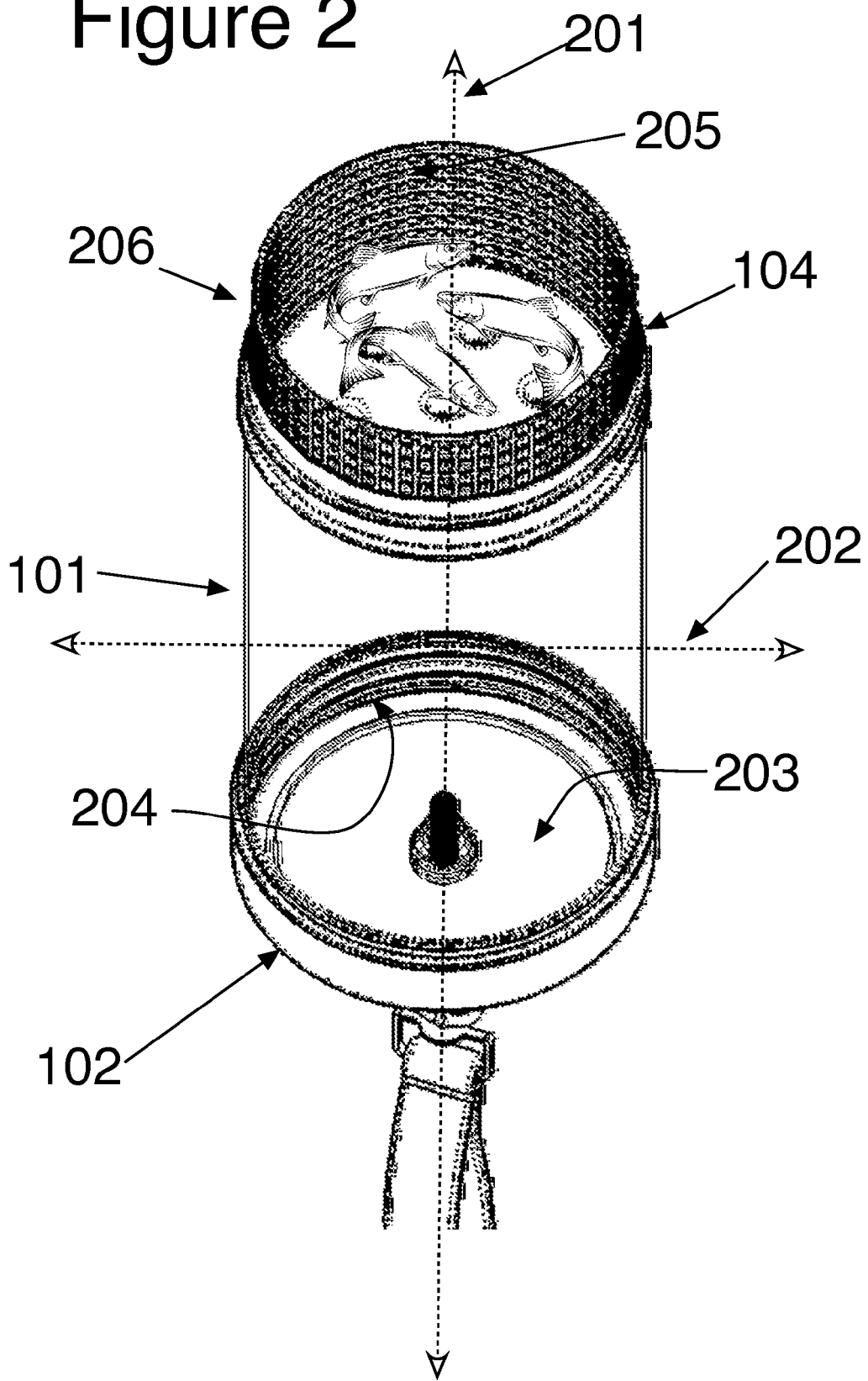
FIG. 2 shows another view of the disclosed minnow container with the minnows raised out of the water by the action of the floating basket after removal of one of the lids.

When the angler wants to remove a minnow, the container is inverted so that the second lid is facing upward and then removed. The floating basket moves towards the cylinder's open second terminus, carrying the minnows with it. The open face of the basket rises above the level of the water in this position and the minnows are held within the basket as shown in FIG. 2. Optimally, the container is filled with a sufficient amount of water so that the closed face of the basket is near the cylinder's second open terminus in this position so that the minnows are most easily accessible by the angler. When access to the minnows is no longer needed, the container's second lid is used to push the basket into the cylinder and is secured in place. The container may then be returned to it's normal position with the first lid at the top.

I claim:

1. A container for animals or objects in a liquid comprising a cylinder, a first lid, a second lid, and a handle-less basket wherein
   a. said cylinder comprises an internal surface having a first diameter, an external surface having a second diameter, a first open terminus, and a second open terminus,
   b. said first lid is capable of being reversibly attached to said first open terminus for forming a substantially liquid-proof seal,
   c. said second lid is capable of being reversibly attached to said second open terminus for forming a substantially liquid-proof seal,
   d. said handle-less basket having a porous, cylindrical sidewall and a buoyancy in a liquid intended to be held within the container by having a specific gravity lower than that of the liquid-intended to be held with the container and comprising an open lower face and a closed upper face,
      i. said closed face of said basket comprising a plurality of holes appropriately sized to allow a flow of the liquid through said holes, but prevent the animals or objects from passing through the holes;
      ii the closed face of the basket being urged to an upper surface of the liquid by said buoyancy.

2. The container of claim 1, further comprising an inwardly directed flange or lip formed at the internal surface of the cylinder and substantially near the first open terminus.

3. The container of claim 1 in which the closed face of the basket is directed towards said first open terminus and said open face is directed towards said second open terminus.

4. The container of claim 1 in which the first lid comprises an attached lanyard.

5. A bait container comprising:
   a generally cylindrical container forming a first upper opening opposite a second lower opening;
   an inwardly directed impingement protrusion formed at said first upper opening;
   a first sealing element for removably sealing said first upper opening;
   a second sealing element for removably sealing said second lower opening;
   a buoyant bait retrieving container slidably retained within said cylindrical container and further comprising:
      a porous, generally cylindrical sidewall bounding a bait containment volume and having a second upper opening opposite a lower bottom;
      a lower strain plate spanning said bottom and allowing for retention of bait;
      said porous, cylindrical sidewall and said lower strain plate both allow for free fluid communication between said bait containment volume and said generally cylindrical container; and
   said second upper opening directed toward said second lower opening;
   wherein when said cylindrical container is oriented with said first upper opening directed upward, said buoyant bait retrieving container is urged upward, positioning said lower strain plate toward said first upper opening and away from any bait contained within said generally cylindrical container near the second lower opening; and
   wherein when said cylindrical container is oriented with said second lower opening directed upward, said buoyant bait retrieving container is urged upward toward said second lower opening, positioning any bait contained within said generally cylindrical container within said bait containment volume.

6. The bait container of claim 5, wherein said generally cylindrical container is formed so as to allow for visual identification of any contents within said bait container.

7. The bait container of claim 6, wherein said cylindrical container is formed at least partially of clear glass or clear plastic.

8. The bait container of claim 7, wherein said cylindrical container is capable of being gasped with one hand.

9. The bait container of claim 5, wherein said buoyant bait retrieving container is formed as a basket.

10. The bait container of claim 9, wherein said generally cylindrical sidewall and said lower bottom are formed as an integrated, buoyant element.

11. A live bait container comprising a cylinder, a first lid, a second lid, and a basket wherein
    a. said cylinder comprises an internal surface having a first diameter, an external surface having a second diameter, a first open terminus, a second open terminus, and in which the internal surface further comprises an inwardly directed lip or flange located substantially near the first open terminus,
    b. said external surface further comprising first male-screw threads located near the first open terminus and comprising second male-screw threads, located near the second open terminus,
    c. said first lid comprises female screw-threads capable of being reversibly attached to the first male screw-threads and forming a substantially liquid-proof seal,
    d. said second lid comprises female screw-threads capable of being reversibly attached to the second male screw-threads and forming a substantially liquid-proof seal,
    e. said basket having a specific gravity lower than that of water and comprising a porous and cylindrical basket sidewall forming an open face and a lower surface forming a closed face,
       i. said closed face comprising a plurality of holes appropriately sized to allow the flow of liquid through said holes, but prevent live bait from passing through the holes,
       ii. said closed face is directed towards said first open terminus and said open face is directed towards said second open terminus, and
       iii. said basket is prevented egress through said first open terminus through physical impingement with said lip or flange while being capable of free egress through said second open terminus.

* * * * *